US006982804B2

(12) United States Patent
Frolik et al.

(10) Patent No.: US 6,982,804 B2
(45) Date of Patent: Jan. 3, 2006

(54) INTELLIGENT PRINTER SETTINGS

(75) Inventors: William R. Frolik, Albany, OR (US);
Dana E. Laursen, Corvallis, OR (US);
William T. McMahon, Corvallis, OR (US);
Theodore E. Ransom, Corvallis, OR (US);
George M. Sachs, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 638 days.

(21) Appl. No.: 10/000,372

(22) Filed: Oct. 31, 2001

(65) Prior Publication Data
US 2003/0081019 A1 May 1, 2003

(51) Int. Cl.
*G06F 15/00* (2006.01)
(52) U.S. Cl. .................... 358/1.15; 358/1.13; 358/1.14
(58) Field of Classification Search ............... 358/1.12, 358/1.13, 1.14, 1.15, 1.18; 400/61, 70
See application file for complete search history.

(56) References Cited

U.S. PATENT DOCUMENTS

| 5,579,446 A | 11/1996 | Naik et al. ................. 395/109 |
| 5,633,662 A | 5/1997 | Allen et al. .................... 347/15 |
| 5,731,823 A | 3/1998 | Miller et al. ................... 347/5 |
| 5,852,745 A | 12/1998 | Fontal et al. ............... 395/835 |
| 6,149,323 A * | 11/2000 | Shima .......................... 400/76 |
| 6,567,181 B1 * | 5/2003 | Onozawa ................... 358/1.15 |
| 6,661,530 B1 * | 12/2003 | Munetomo et al. ......... 358/1.15 |
| 6,704,122 B2 * | 3/2004 | Moro et al. .................. 358/1.9 |
| 6,738,587 B1 * | 5/2004 | Hoene et al. ................. 399/77 |
| 6,765,686 B2 * | 7/2004 | Maruoka ................... 358/1.15 |

FOREIGN PATENT DOCUMENTS

| EP | 1 026 578 | 8/2000 |
| WO | WO 01/20472 | 3/2001 |

* cited by examiner

*Primary Examiner*—Mark Wallerson

(57) ABSTRACT

A computer system includes an application with the ability to select printer settings from any of a variety of potential sources, and associate the printer settings with a document to be printed. The potential sources may include user-selected sets of printer settings that are particular to the document to be printed, are associated generally with the documents to be printed using the application, and globally associated with the computer system. The potential sources may also include a set of content-provider printer settings associated with the document and selected by a content-provider of the document.

15 Claims, 3 Drawing Sheets

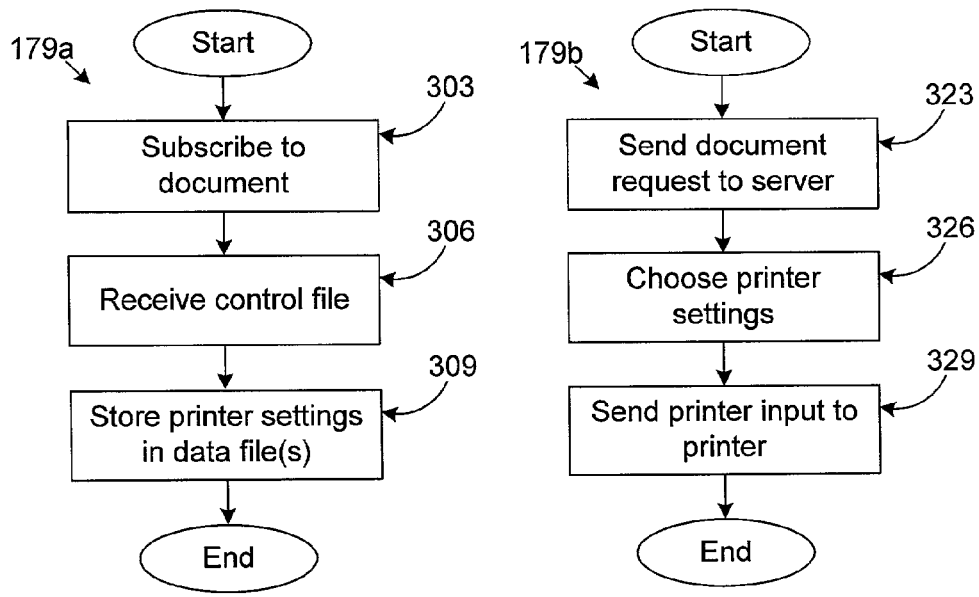
FIG. 4
FIG. 5
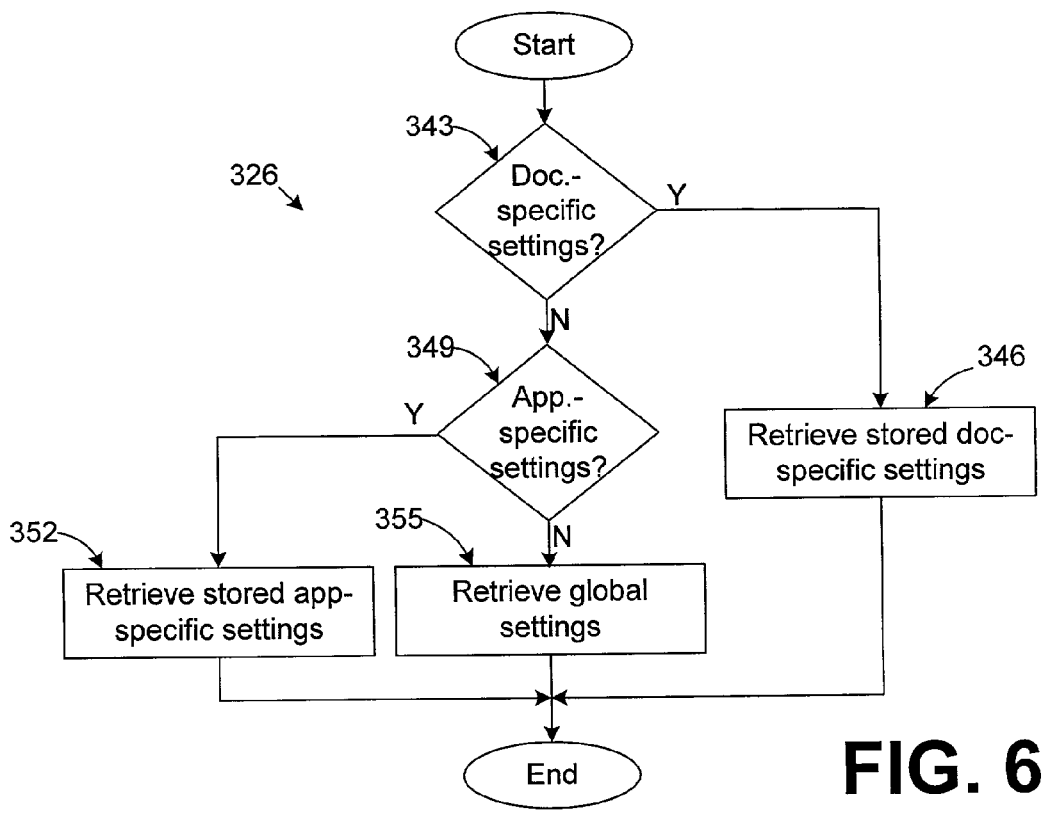
FIG. 6

— 1 —
INTELLIGENT PRINTER SETTINGS

TECHNICAL FIELD

The invention relates generally to systems and methods for controlling a printer and for document delivery to a printer and printing.

BACKGROUND ART

Various types of computer applications support printing of documents.

For one type of application, namely, document editors such as word processors, printer settings are generally maintained within a document, and settings are also maintained with the application. When a document is printed within an application, the printer settings default to the same settings used for previously printing the same document. Subsequently when a document is printed, the printer settings default to the same settings used for printing the last document printed with the application during the same session.

For another type of application, namely, browsers such as Internet browsers, the printer settings are generally maintained within the application. When a document is printed, printer settings default to the same settings used for printing the previous document.

It will be appreciated that the above-described methods for controlling printer settings may produce undesired results and may involve additional steps and effort on the part of a user to obtain printing of documents with desired settings.

SUMMARY OF THE INVENTION

According to an aspect of the invention, a system of controlling a printer using an application in a computer system includes: choosing, in the computer system, a group of printer settings from a group of potential printer-setting sources; associating, in the computer system, the printer settings with a document; and sending the printer settings to the printer prior to printing the document. The potential sources include at least one set of user-selected printer settings selected by a user of the computer system, and a set of content-provider-selected printer settings selected by a content provider of the document.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings,

FIGS. 4–6 are flowcharts of components/processes of the present invention.

DETAILED DESCRIPTION

A computer system includes an application that involves printing, with the ability to select printer settings from any of a variety of potential sources, and associate the printer settings with a document to be printed. The potential sources may include user-selected sets of printer settings that are particular to the document to be printed, are associated generally with the documents to be printed using the application, and globally associated with the computer system. The potential sources may also include a set of content-provider printer settings associated with the document and selected by a content-provider of the document.

The application may include logic to select from the potential sources of printer settings by a hierarchical method of selection. For example, the computer system and application may be configured to use user-selected document-specific printer settings, if available. If no user-selected document-specific printer settings are available, then the application and computer system may be configured to use, in descending order of preference, 1) content-provider printer settings; 2) printer settings associated with all documents printed using the application; and 3) globally-associated printer settings maintained on the computer system, such as printer settings associated with the printer by the operating system of the computer system.

The application may involve delivery and printing of documents that are maintained at a remote location, and may involve periodically downloading and printing a document from a specified location at which content is changed periodically. Thus the application may allow for automated retrieval and printing of documents at specified times, for example on a daily basis. Such automated retrieval and printing is referred to as "subscribing" to a document, although it will be understood that a class or series of documents is being subscribed to. The feature of the application allowing utilization of printer settings from a number of potential sources allows optimization of printer settings for different subscriptions. A user can set printer settings for each of the documents, or can rely on content-provider settings or more general user-selected settings for some or all of the documents subscribed to.

Figure 1:
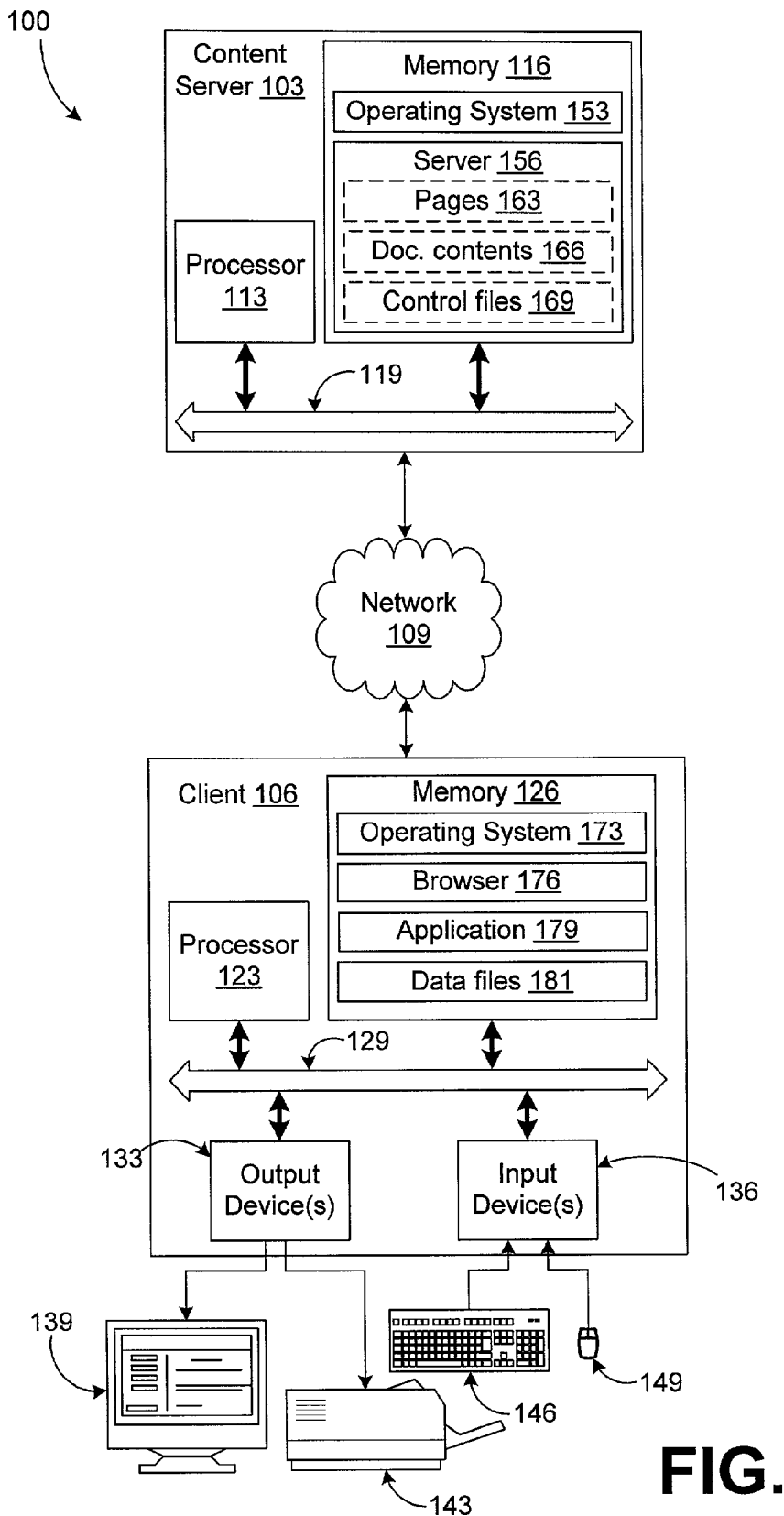
FIG. 1 is a block diagram of a printer control system according to the present invention.

Referring initially to FIG. 1, a document delivery system 100 is shown. The document delivery system 100 includes a server 103 and a client 106, both of which are coupled to a network 109. The server 103 may include, for example, a computer system or other apparatus with similar capability. In particular, the server 103 includes a processor circuit with a processor 113 and a memory 116, both of which are coupled to a local interface 119. The local interface 119 may include, for example, a data bus with an accompanying control/address bus, as is generally known by those with ordinary skill in the art.

Various peripheral devices may be employed with the server 103. In particular, peripheral devices to obtain user input may include, for example, a keypad, touchpad, touch screen, microphone, scanner, mouse, joystick, or one or more push buttons, etc. Peripheral devices providing user output may include display devices, indicator lights, speakers, printers, etc. Specific display devices may be, for example, cathode ray tubes (CRTs), liquid crystal display (LCD) screens, light emitting diode (LED) displays, gas plasma-based flat panel displays, etc.

The server 103 is intended to represent one of a plurality of servers coupled to the client 106 via the network 109.

The client 106 may include, for example, a computer system or other system with similar capability. In particular, the client 106 includes a processor circuit with a processor 123 and a memory 126, both of which are coupled to a local interface 129. The local interface 129 may be, for example, a data bus with an accompanying control/address bus, as is generally known by those with ordinary skill in the art. The client 106 also includes various output interfaces 133 and input interfaces 136, through which the client 106 may be connected to various peripheral devices. Such peripheral devices may include a display device 139, a printer 143, a keyboard 146, and a mouse 149. Other peripheral devices that may be employed by the client 106 to receive various user input and/or to provide user output include those listed above with regard to the server 103.

The memories 116 and 126 may include both volatile and nonvolatile memory and data storage components. Volatile components are those that do not retain data values upon loss of power. Nonvolatile components are those that retain data upon a loss of power. Thus, the memories 116 and 126 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other such of memory device.

Also, each of the processors 113 and 123 may represent multiple processors and each of the memories 113 and 123 may represent multiple memories that operate in parallel processing circuits, respectively. In such a case, each of the local interfaces 119 and 129 may be an appropriate network that facilitates communication between any two of the multiple processors, between any processor and any of the memories 116 and 126, or between any two of the memories, etc. The processors 113 and 123 may be electrical or optical in nature.

The network 109 includes, for example, the Internet, wide area networks (WANs), local area networks, or other suitable networks, etc., or any combination of two or more such networks. The server 103 and the client 106 is coupled to the network 109 to facilitate data communication to and from the network 109 in any one of a number of ways that are generally known by those of ordinary skill in the art. The server 103 and/or the client 106 may be linked to the network 109 through various devices such as, for example, network cards, modems, or other such communications devices.

The server 103 also includes various software components that are stored on the memory 116 and are executable by the processor 113. These components include an operating system 153 and a server 156. The server 156 includes one or more pages 163, document contents 166 (also referred to herein as "documents"), and control files 169 associated with the document contents 166. As explained in greater detail below, the document contents 166 may be documents that are downloaded to the client 106 to be printed by the printer 143. The control files 169 may correspond to respective of the documents 166, and may include printer settings recommended for printing the corresponding documents 166. The printer settings in the control files 169 may be those recommended by the content provider that had a part in the creation or propagation of the corresponding document 166. The documents 166 and the control files 169 may be part of or linked to the pages 163.

The client 106 also includes a number of software components that are stored on the memory 126 and are executable by the processor 123. In particular, the client 106 includes an operating system 173 and a browser 176. By manipulating the browser 176, the pages 163 may be downloaded from the server 103 having been transmitted by the server 156, stored on the memory 116 of the server 103. Thus, the browser 176 and the server 156 may operate according to the dictates of the World Wide Web protocol, for example, or another suitable protocol. In this sense, the pages 163 may be Web pages created using hypertext markup language (HTML), as is generally known by those with ordinary skill in the art. Alternatively, other programming languages may be employed to create the pages 163, including Extensible Markup Language (XML) or other markup languages, JAVA, Active Server Page, Scripting (ASP), Javascript, C++, or other suitable computer languages. It will also be appreciated that the pages 163 may include other types of pages and/or data files.

The memory 126 also includes an application 179 and data files 181. The application 179 represents any of a variety of applications that can forward printer settings and document information (such as rendered document content) to the printer 143. As explained in greater detail below, the application 179 may be an application that downloads documents from the content server 103 and prints documents on the printer 143. For example, the application 179 may be configured to periodically download documents from one or more locations on the World Wide Web, and pass them along to the printer 143 for printing. An example of such an application is software for Hewlett Packard's HP Instant Delivery Service, which allows users to subscribe to one or more documents for delivery to a printer at specified intervals.

It will be appreciated that the application 179 may alternatively be another type of application, which may perform other functions in addition to or instead of those listed above. For example, the application 179 may alternatively include word processing and/or formatting functions, or may be otherwise configured to create and/or alter document content. As another example, the application 179 may be able to display documents or other information on the display 139, and the displaying may be interactive, for instance allowing a user of the client 106 to change which portion of the document is displayed on the display 139. Other suitable functions that may be performed by the application 179 will be known to those skilled in the art.

The application 179 is represented as a single entity, but it will be appreciated that the functions of the application 179 may be performed by multiple computer programs. The term "application," as used herein, is intended to broadly include situations where the functions are performed in other manners, for example by multiple computer programs.

The data files 181 may include one or more types of data files for storing information on the client 106. As explained in greater detail below, the data files 181 may include files for storing printer settings corresponding to the specific documents to be printed by the application 179. The data files 181 may include files for storing printer settings corresponding to groups of classes of documents to be printed by the application 179. As another possibility, the data files 181 may include files for storing printer settings corresponding to all documents to be printed by the application 179, for example indicating general preferences to be followed in printing documents by the application 179, in the absence of other directives. Alternatively or in addition, the data files 181 may include files for storing global printer settings associated with the printer 143, and to be generally used by the client 106 in printing documents on the printer 143. The printer settings stored in the data files 181 may include printer settings from a variety of ultimate sources, for example including user preferences selected by the user of the client 106; default preferences installed by the supplier(s) of the client 106, the printer 143, the operating system 173, the browser 176, and/or the application 179; and/or content-provider preferences included in the control files 169 and downloaded to the client 106. It will be appreciated that there may be other suitable sources for the printer settings stored in the data files 181.

Both of the operating systems 153 and 173 are executed to control the allocation and usage of hardware resources in the server 103 and the client 106, respectively. Specifically, the operating systems 153, 173 control the allocation and usage of the memory 116 and 126, processing time, and the peripheral devices as well as performing other functionality. In this manner, the operating systems 153, 173 serve as the foundation on which applications depend as is generally known by those with ordinary skill in the art.

Figure 2:
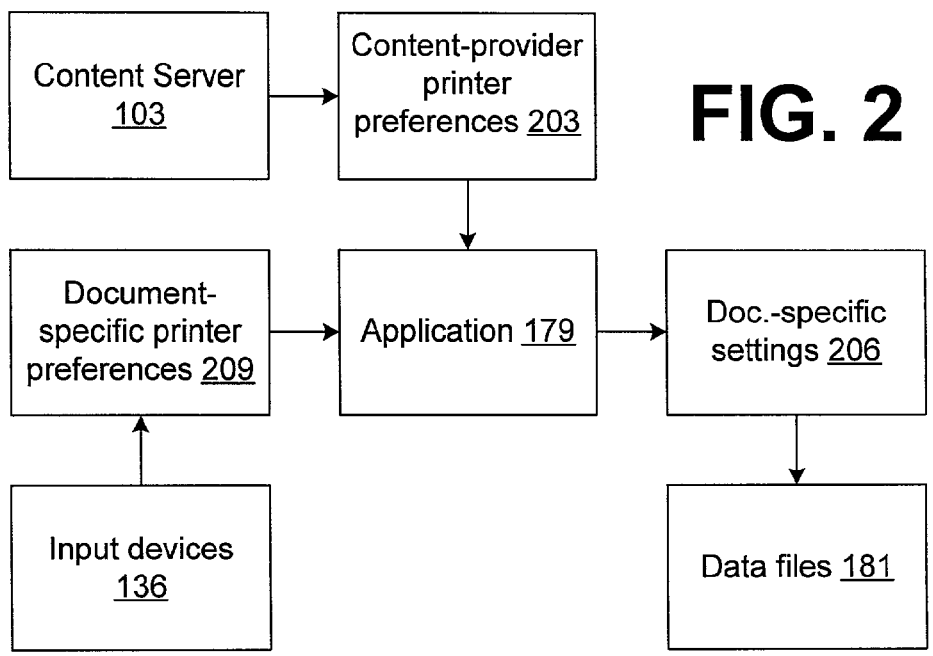
FIGS. 2 and 3 are diagrams illustrating information flow using the system of FIG. 1.
Figure 3:
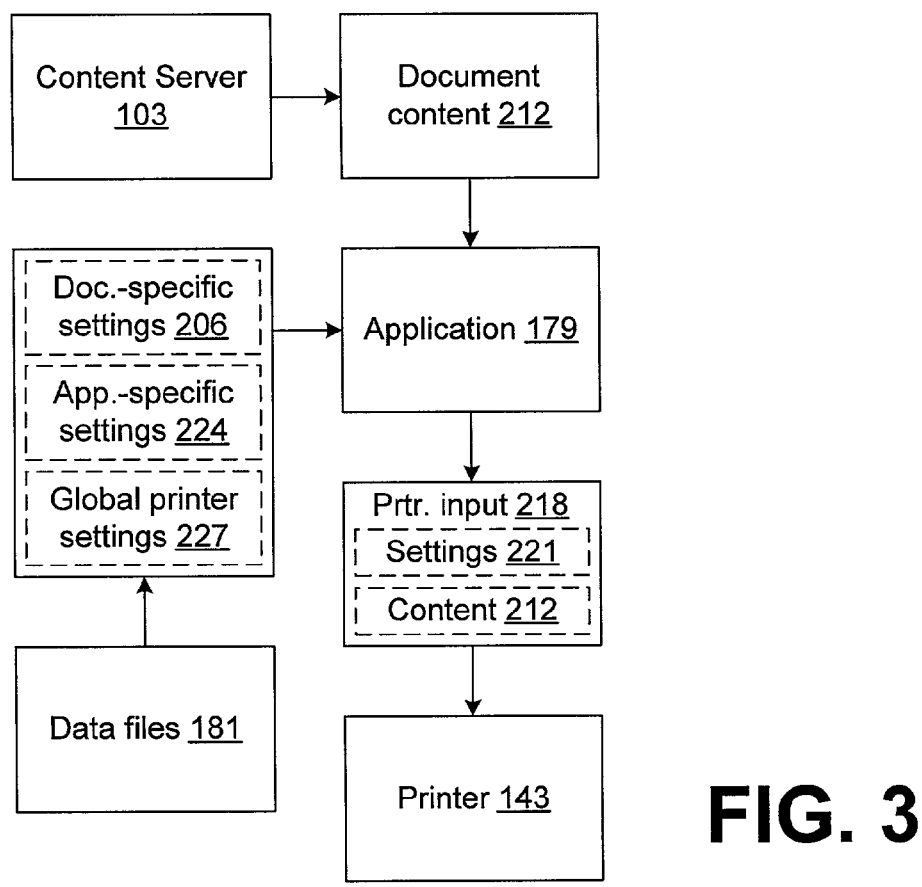

FIGS. 2 and 3 illustrate information flow in the selection of a set of printer settings corresponding to a document to be printed, and the sending of the settings and the document to the printer 143. According to a specific embodiment of the invention, this process is performed in two steps, one taking place when the user subscribes to a document, and the other taking place when the document is actually printed (delivered). FIG. 2 illustrates the part of the process occurring when the document is subscribed to, as well as any changes in the printer settings associated with the document and stored on the client 106, that may occur prior to the time the document is to be delivered. FIG. 3 illustrates information flow in a second part of the process, at the time of delivery.

FIG. 2 shows information flow for an aspect of the document delivery system 100. When a user of the client 106 (FIG. 1) subscribes to a document through the application 179, the client 106 may send a message to the control server 103 requesting information related to the subscribed document. The content server 103 may then send one or more control files 169 (FIG. 1), corresponding to the subscribed document, to the client 106. The control files 169 may include content-provider printer preferences or settings 203. The printer settings may include instructions to the printer regarding printing the subscribed document. Examples of possible printer settings include how many pages of the document to print on each page; whether to print a border on pages of the document; the order of printed pages (e.g., last page first or first page first); whether or not to print on both sides of a page (for printers having the ability to produce double-sided prints), the maximum number of pages of the document to print; the number of copies of the document to print; the orientation of the document (portrait or landscape); the print quality to be used; a range of pages to be printed; the size of paper to be used; the size of margins; and header and footer contents. It will be appreciated that other suitable printer settings may also be included.

The control files 169 may include other information besides the content-provider printer settings 203. For example, the control file 169 may include recommended intervals and times of day for downloading and printing the corresponding document.

The control files 169 allow the provider of the corresponding document(s) to specify or suggest suitable ways that the corresponding document(s) may be formatted, printed, and delivered to the user of the client 106. Each of the control files 169 may correspond to a single document or class of documents located at a specified location. Alternatively, a single control file 169 may correspond to multiple documents, for instance a class of documents or all of the documents offered by one or more content providers. Thus a single content provider may suggest printer settings for a group of documents that allow a uniform appearance when those documents are printed.

When the control file 169 is received by the application 179, the control file 169 may be examined to determine the printer preferences or settings 203 contained therein. The printer preferences or settings 203 may be then saved in the data files 181 as printer settings 206 associated with the subscribed document. The data file 181 used for storing the associated printer settings 206 may be a single data file used for storing settings corresponding to each of the subscribed documents. Alternatively, multiple data files 181 may be used to save the printer settings corresponding to the subscribed documents. For example there may be a data file 181 corresponding to each of the subscribed documents. It will be appreciated that the data file(s) 181 used for saving the associated printer settings 206 may include additional saved information related to the subscribed document. For example, the data file(s) may include information such regarding the timing of delivery, the date and results of the last delivery, and the date and time the subscription was commenced. It will be appreciated that other suitable information may also be contained in the data file(s) used for storing the associated printer settings 206.

It will be understood that creation of a control file 169 may be optional on the part of a content provider. In addition, there may be types of documents or locations of documents that may be subscribed to by the application 179 for which there are no corresponding control files 169. In such a case it will be appreciated that the application 179 may be configured to not store any printer settings in the data file, as well as to perhaps set a flag, bit or other indicator in the file to indicate that printer settings from a control file 169 were not received. Alternatively, the application 179 may be configured to store certain default printer settings in the data file(s) 181 upon subscription to such a document. Such default settings may be obtained and/or generated by any of a variety of suitable sources.

The application 179 may be configured such that the user of the client 106 may also input printer settings that override those settings suggested by the content provider. This inputting may occur during the subscription process, or may occur at a later time. Using the input devices 136 (FIG. 1), such as the keyboard 146 (FIG. 1) and the mouse 149 (FIG. 1), the user may generate a set of document-specific printer preferences or settings 209, and input the settings 209 into the application 179. The user-selected document-specific printer preferences or settings 209 may be generated by an interactive process within the application 179. For example, the user may interact with dialog boxes, menus, selection lists, or other well-known devices generated by the application 179 and displayed on the display 139 (FIG. 1). Many other suitable means of registering and recording preferences are well known in the art.

The document-specific printer preferences or settings 209 are received by the application 179, and are used as new associated printer settings 206 to overwrite the associated printer settings previously stored in the data file 181. In addition, a flag, bit or other indicator may be set in the data file 181 to indicate that user-selected settings have been saved in the data file 181, as opposed to content-provider printer settings. Such an indicator may be used in returning to default settings or in otherwise undoing the user-selected settings. The indicator of the user-selected settings may also be used in the hierarchical selection of printer settings from a group of potential sources of printer settings.

The application 179 may be configured to allow the user to overwrite the user-selected document-specific settings in the data file 181 with other user-selected settings, if desired.

FIG. 3 illustrates information flow in a second part of the process of selecting printer settings to associate with a document and download to the printer 143. The second part of the process occurs when the application 179 seeks to download and print a document. The application 179 downloads document content 212 from the content server 103. The application 179 also makes a determination as to what printer settings to send to the printer 143 in connection with the printing of the document content 212. The determination as to which printer settings to use may be made before the download of the document content, after the download of the document content, or wholly or partially concurrently therewith.

After the determination in the application 179 of which printer settings to use, the application 179 sends printer input 218 to the printer 143. The printer input 218 includes the document content 212 and the printer settings 221 selected by the application 179. The printer settings 221 are used to control the printer 143 in printing the document content 212.

In selecting the printer settings 221, the application 179 may select a set of printer settings from a group of possible sources of printer settings. The printer settings may be printer settings stored in one or more of the data files 181. As illustrated in FIG. 3, the data files 181 may include multiple sets of printer settings associated with various levels of generality related to the document, the application, and print jobs in general printed by the client 106 (FIG. 1) on the printer 143. The data files 181 may include printer settings associated with the document (subscription) to be printed, such as the printer settings 206 discussed above with relation to FIG. 2. The data files 181 may include one or more files with more generally applicable printer settings, for example a set of user-selected printer settings 224 associated generally with the application 179, as opposed to being associated with the specific document being printed. As another example, the data files may include a set of global printer settings 227 associated generally with print jobs generated by the client 106 for printing on the printer 143, regardless of which application requests a print job. The set of global printer settings 227 may be maintained as part of the operating system 173 (FIG. 1). An example of such a global printer settings set is the printer settings maintained as part of Microsoft Windows 2000, which is accessible through the "Settings" entry in the "Start" menu.

It will be appreciated that the types of data files 181 use to store the different sets of settings available to the application 179 may be different from one another, and may include different types of printer settings/parameters. Further, it will be appreciated that some or all of the data files 181 may be maintained in location remote from the client 106, yet accessible by the client 106. For instance, some or all of the data files 181 may be maintained on a remote shared drive accessible via a network such as the network 109.

The application 179 may employ a hierarchical method of determining which of the group of potential sources is the source used for the printer settings 221. As an example, the application 179 may select the printer settings 206 associated with the specific document to be printed, if such a set of printer settings exists or has been created. If the document-specific printer settings 206 have not been set, then the application 179 may be configured to next check for the application-specific user-selected printer settings 224, and to use these as the selected printer settings 221, if they exist. If the application-specific user-selected printer settings 224 do not exist, for example having not been set by a user of the client 106, then the application may be configured to use the global printer settings 227 as default values for the selected printer settings 221 to be used by the printer 143 in printing the document content 212.

It will be appreciated that the hierarchy described above is but one example of multi-level hierarchical systems in which printer settings may be selected with preference given to more narrowly-applicable sets of settings (e.g., document-specific settings) and less preference given to more broadly-applicable sets of printer settings (e.g., global printer settings not associated with any particular application). It will be appreciated that such a hierarchy may have more or fewer levels than the specific example described above. For example, a two-level hierarchy (document-specific settings and global settings) or a four-level hierarchy (document-specific settings, settings corresponding to class containing multiple documents, application-specific settings, and global settings). Further, it will be appreciated that such a hierarchy need not involve giving the highest preference to the most narrowly applicable settings, if desired. For example, the application 179 may be configured to give application-specific settings priority over some or all document-specific settings.

FIGS. 4–6 show flowcharts of the general functionality (logical function) of the application 179 (FIG. 1) of the client 106 (FIG. 1). Alternatively, the flowcharts of FIGS. 4–6 may represent method steps taken in executing the application 179. The flowcharts in FIGS. 4–6 provide a general outline of the functionality of the actions described above, with regard to the functionality of the application 179. The description below with regard to FIGS. 4–6 omits for brevity certain details described above with regard to FIGS. 2 and 3, and includes additional details and alternatives.

Referring first to FIG. 4, a high-level flowchart is shown of the subscription process 179*a* performed by the application 179. In block 303 the user subscribes to the desired document using the application 179, in an interactive process with the content server 103. This sends a message to the content server 103, and in block 306 the control file(s) 169 are received by the application 179 from the content server 103. In block 309 the document-specific printer settings 206 are stored in the data files 181. As discussed above with regard to FIG. 2, the document-specific printer settings 206 may be a set of settings extracted or otherwise determined from the control file 169, or the document-specific printer settings 206 may be document-specific settings entered by the user into the application 179 during the subscription process. In addition, the document-specific settings stored as part of the subscription process may be modified or overwritten later by the user through an appropriate interface generated by the application 179.

Turning now to FIG. 5, a high-level flowchart is shown of the document retrieval and printing process 179*b* performed by the application 179. In block 323, a document request is sent by the application 179 to the content server 103, requesting download of the document content 212. In block 326, the application 179 makes a selection as to which printer settings, from settings provided by or potentially available from various potential sources of settings, are to be the selected printer settings 221 to be used in printing the document. As described above, the selection may be based on a hierarchy of the potential sources, with document-specific settings most preferred, followed by application-specific settings and global printer settings. Finally, in block 329 the printer input 218, including the document content 212 and the printer settings, are sent to the printer 143. The document content 212 that is sent to the printer 143 may be suitable rendered by the application 179 to allow printing by the printer 143.

FIG. 6 is a flowchart showing further details of the printer settings selection process in block 326 (FIG. 5). In block 343 the application 179 checks for the presence of a data file 181 containing the document-specific printer settings 206. If such a data file 181 exists, in block 346 the document-specific printer settings 206 are retrieved and used as the selected printer settings 221 that are forwarded to the printer 143.

If there are no data files containing document-specific printer settings 206, then in block 349 the application checks for the presence of a data file 181 containing the application-specific printer settings 224 corresponding to the application 179. If the application-specific printer settings 224 are available, then in block 352 the application-specific printer settings 224 are retrieved from the corresponding data file 181, and are utilized as the selected printer settings 221 to be forwarded to the printer 143. If no application-specific printer settings 224 are available, then in block 355 the global printer settings 227 are retrieved and used as the selected printer settings 221 to be forwarded to the printer 143.

It will be appreciated that the selection of the document-specific printer settings 206, described above with regard to FIGS. 2 and 4, also involves selection and hierarchical choice. In the embodiment described above, user-selected document-specific printer settings are preferred over content-provider-selected document-specific printer settings, although it will be appreciated that the application 179 may be configured such that a different preference is used.

The application-specific printer settings 224 may be user selected. Alternatively, the application-specific printer settings 224 may selected other than by the user, for example being default settings set as part of the initial settings for the application 179.

It will be appreciated that the system described above for controlling printer settings may be employed with suitable modifications in a wide variety of applications, for example in word processing applications. The system and method for controlling printer settings may involve applications that fully operate on a self-contained computer system, which does not require download of documents.

The printer 143 has been shown in FIG. 1 and described above as directly or locally attached to the client 106. However, it will be appreciated that the client 106 may be attached to a remote printer such as a network printer, for example, via a wired or wireless network.

Although the application 179 (FIG. 1) of the present invention is embodied in software or code executed by general purpose hardware as discussed above, as an alternative the application 179 may also be embodied in dedicated hardware or a combination of software/general purpose hardware and dedicated hardware. If embodied in dedicated hardware, the application 179 (FIG. 1) can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flowcharts of FIGS. 4–6 show the architecture, functionality, and operation of an implementation of the application 179. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the block diagrams and/or flowcharts of FIGS. 4–6 show a specific order of execution, it is understood that the order of execution may differ from that which is depicted. For example, the order of execution of two or more blocks may be scrambled relative to the order shown. Also, two or more blocks shown in succession in FIGS. 4–6 may be executed concurrently or with partial concurrence. In addition, any number of counters, state variables, warning semaphores, or messages might be added to the logical flow described herein, for purposes of enhanced usability, accounting, performance measurement, or providing troubleshooting aids, etc. It is understood that all such variations are within the scope of the present invention. Also, the block diagram and/or flowcharts of FIGS. 2–6 are relatively self-explanatory and are understood by those with ordinary skill in the art to the extent that software and/or hardware can be created by one with ordinary skill in the art to carry out the various logical functions as described herein.

Also, where the application 179 (FIG. 1) comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the application 179 (FIG. 1) for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

According to another aspect of the invention, a method of printing remote documents from a local computer system, includes: subscribing to a document provided by a remote computer system; associating, with the document, in the local computer system, a set of document-specific printer settings, if available; downloading document content of the document from the remote computer system; choosing printer settings for printing the document from a group of potential printer-setting sources, wherein the group of potential sources includes the set of document-specific printer settings; and sending the printer settings and the document content to a printer.

According to yet another aspect of the invention, a system for controlling a printer using an application in a computer system includes a processor coupled to a local interface; a memory coupled to a local interface; and processing logic stored on the memory and executable by the processor. The processing logic includes: logic that chooses a group of printer settings from a group of potential printer-setting sources, wherein the potential sources include at least one set of user-selected printer settings selected by a user of the computer system, and a set of content-provider-selected printer settings selected by a content provider of the document; logic that associates the printer settings with a document; and logic that sends the printer settings to the printer prior to printing the document.

Thus according to an aspect of the application, a method for printer control includes associating printer settings from any of a variety of potential sources with a document, in a computer system, and sending printer settings to a printer coupled to the computer system.

According to still another aspect of the invention, a system for printing remote documents from a local computer system includes a processor coupled to a local interface; a memory coupled to a local interface; and processing logic stored on the memory and executable by the processor. The processing logic includes logic that subscribes to a document on a remote computer system; logic that associates with the document a set of document-specific printer settings, if available; logic that downloads document content of the document from the remote computer system; logic that chooses printer settings for printing the document from a group of potential printer-setting sources, wherein the group of potential sources includes the set of document-specific printer settings; and logic that sends the printer settings and the document content to a printer.

According to a further aspect of the invention, a system for controlling a printer using an application in a computer system includes: means to choose, in the computer system, a group of printer settings from a group of potential printer-setting sources, wherein the potential sources include at least one set of user-selected printer settings selected by a user of the computer system, and a set of content-provider-selected printer settings selected by a content provider of the document; means to associate, in the computer system, the printer settings with a document; and means to send the printer settings to the printer prior to printing the document.

According to a still further aspect of the invention, a system for printing remote documents from a local computer system, includes: means to subscribe to a document on a remote computer system; means to associate, with the document, in the local computer system, a set of document-specific printer settings, if available; means to download document content of the document from the remote computer system; means to choose printer settings for printing the document from a group of potential printer-setting sources, wherein the group of potential sources includes the set of document-specific printer settings; and means to send the printer settings and the document content to a printer.

According to another aspect of the invention, a computer program embodied in a computer readable medium for controlling a printer, includes: at least one statement for choosing a group of printer settings from a group of potential printer-setting sources, wherein the potential sources include at least one set of user-selected printer settings selected by a user of the computer system, and a set of content-provider-selected printer settings selected by a content provider of the document; at least one statement for associating the printer settings with a document; and at least one statement for sending the printer settings to the printer prior to printing the document.

According to yet another aspect of the invention, a computer program embodied in a computer readable medium for printing remote documents from a local computer system, includes: at least one statement for subscribing to a document provided by a remote computer system; at least one statement for associating, with the document, in the local computer system, a set of document-specific printer settings, if available; at least one statement for downloading document content of the document from the remote computer system; at least one statement for choosing printer settings for printing the document from a group of potential printer-setting sources, wherein the group of potential sources includes the set of document-specific printer settings; and at least one statement for sending the printer settings and the document content to a printer.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of controlling a printer using an application in a computer system, comprising:
   downloading document content of the document to the computer system from a remote computer system;
   setting an indicator if a set of content-provider-selected printer settings is unavailable to be downloaded to the computer system with the document;
   choosing, in the computer system, a group of printer settings from a group of potential printer-setting sources;
   associating, in the computer system, the printer settings with a document; and sending the printer settings to the printer prior to printing the document;

wherein the potential sources include at least one set of user-selected printer settings selected by a user of the computer system, and a set of content-provider-selected printer settings selected by a content provider of the document if the set of content-provider-selected printer settings are available.

2. The method of claim 1, wherein the choosing includes hierarchically choosing one of the potential sources as the source for the printer settings.

3. The method of claim 1, wherein the at least one set of user-selected settings includes a set of document-specific user-selected settings, and a set of application-specific user-selected settings associated with the application.

4. The method of claim 3, wherein the potential sources further includes a set of global settings stored on the computer system outside the application.

5. The method of claim 4, wherein the choosing includes hierarchically choosing one of the potential sources as the source for the printer settings.

6. The method of claim 5, wherein the hierarchical choosing includes ordering the potential sources, from most favored to least favored, as the set of document-specific user-selected settings, the set of content-provider-selected printer settings, the set of application-specific user-selected settings, and the set of global settings.

7. A method of printing remote documents from a local computer system, comprising:

subscribing to a document provided by a remote computer system;

associating, with the document, in the local computer system, a set of document-specific printer settings, if available;

setting an indicator to indicate that the document-specific printer settings have been associated with the document;

downloading document content of the document from the remote computer system;

choosing printer settings for printing the document from a group of potential printer-setting sources, wherein the group of potential sources includes the set of document-specific printer settings; and sending the printer settings and the document content to a printer.

8. The method of claim 7, wherein the choosing includes hierarchically choosing one of the potential sources as the source for the printer settings.

9. The method of claim 8, wherein the set of document-specific printer settings includes a set of user-selected document-specific printer setting selected by a user of the local computer system, and a set of content-provider-selected printer settings selected by a content provider of the document;

wherein the group of potential sources further includes a set of application-specific user-selected settings and a set of global settings stored on the computer system outside the application; and wherein the associating and the hierarchical choosing includes ordering the potential sources, from most favored to least favored, as the set of document-specific user-selected settings, the set of content-provider-selected printer settings, the set of application-specific user-selected settings, and the set of global settings.

10. A system for controlling a printer using an application in a computer system, comprising:

a processor coupled to the local interface;

a memory coupled to the local interface; and processing logic stored on the memory and executable by the processor including:

logic that chooses a group of printer settings from a group of potential printer-selling sources, wherein the potential sources include at least one set of user-selected printer settings selected by a user of the computer system, and a set of content-provider-selected printer settings selected by a content provider of the document if the set of content-provider-selected printer settings is available;

logic that sets an indicator if the set of content-provider-selected printer settings is not available;

logic that associates the printer settings with a document; and logic that sends the printer settings to the printer prior to printing the document.

11. A system for printing remote documents from a local computer system, comprising:

a processor coupled to a local interface;

a memory coupled to a local interface; and processing logic stored on the memory and executable by the processor including:

logic that subscribes to a document on a remote computer system;

logic that associates with the document a set of document-specific printer settings, if available;

logic that sets an indicator to indicate that the document-specific printer settings have been associated with the document if the set of document-specific printer settings am available;

logic that downloads document content of the document from the remote computer system;

logic that chooses printer settings for printing the document from a group of potential printer-setting sources, wherein the group of potential sources includes the set of document-specific printer settings; and logic that sends the printer settings and the document content to a printer.

12. A system for controlling a printer using an application in a computer system, comprising:

means for choosing, in the computer system, a group of printer settings from a group of potential printer-setting sources, wherein the potential sources include at least one set of user-selected printer settings selected by a user of the computer system, and a set of content-provider-selected printer settings selected by a content provider of the document if the set of content-provider-selected printer settings is available;

means for indicating whether the set of content-provider-selected printer settings is available for selection;

means for associating, in the computer system, the printer settings with a document; and means for sending the printer settings to the printer prior to printing the document.

13. A system for printing remote documents from a local computer system, comprising:

means for subscribing to a document on a remote computer system;

means for associating, with the document, in the local computer system, a set of document-specific printer settings, if available;

means for setting an indicator to indicate that the document-specific printer settings have been associated with the document if the set of document-specific printer settings are available;

means for downloading document content of the document from the remote computer system;

means for choosing printer settings for printing the document from a group of potential printer-setting sources, wherein the group of potential sources includes the set of document-specific printer settings; and means for sending the printer settings and the document content to a printer.

14. A computer program embodied in a computer readable medium for controlling a printer, comprising:

at least one statement for choosing a group of printer settings from a group of potential printer-setting sources, wherein the potential sources include at least one set of user-selected printer settings selected by a user of the computer system, and a set of content-provider-selected printer settings selected by a content provider of the document if the set of content-provider-selected printer settings is available;

at least one statement for indicating whether the set of content-provider-selected printer settings is available for selection;

at least one statement for associating the printer settings with a document; and at least one statement for sending the printer settings to the printer prior to printing the document.

15. A computer program embodied in a computer readable medium for printing remote documents from a local computer system, comprising:

at least one statement for subscribing to a document provided by a remote computer system;

at least one statement for associating, with the document, in the local computer system, a set of document-specific printer settings, if available;

at least one statement for setting an indicator to indicate that the document-specific printer settings have been associated with the document if the set of document-specific printer settings are available;

at least one statement for downloading document content of the document from the remote computer system;

at least one statement for choosing printer settings for printing the document from a group of potential printer-setting sources, wherein the group of potential sources includes the set of document-specific printer settings; and at least one statement for sending the printer settings and the document content to a printer.

* * * * *

UNITED STATES PATENT AND TRADEMARK OFFICE
CERTIFICATE OF CORRECTION

PATENT NO. : 6,982,804 B2  
APPLICATION NO. : 10/000372  
DATED : January 3, 2006  
INVENTOR(S) : Frolik et al.

It is certified that error appears in the above-identified patent and that said Letters Patent is hereby corrected as shown below:

Below the "SUMMARY OF THE INVENTION" heading in Col. 1, insert the following paragraph:
--A method for printer control includes associating printer settings from any of a variety of potential sources with a document, in a computer system, and sending the printer settings to a printer coupled to the computer system.--

Delete lines 5 - 30 in Col. 11, lines 36 - 67 in Col. 11, and lines 1 - 33 in Col. 12 and reinsert them between lines 46 and 47 in Col. 1.

Delete lines 31 - 35 in Col. 11.

Signed and Sealed this

Twenty-first Day of August, 2007

JON W. DUDAS  
*Director of the United States Patent and Trademark Office*